Jan. 2, 1923.　1,441,064.
N. C. CHRISTENSEN.
PROCESS OF TREATING LEAD ORES WITH CHLORIDE SOLUTIONS.
FILED DEC. 3, 1920.
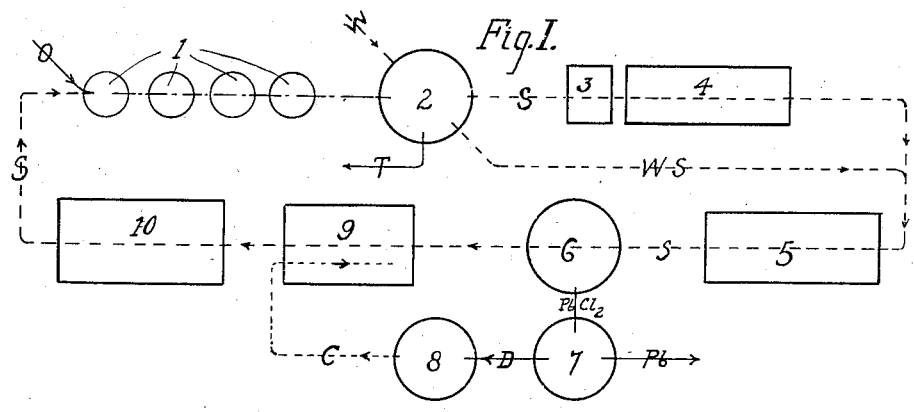
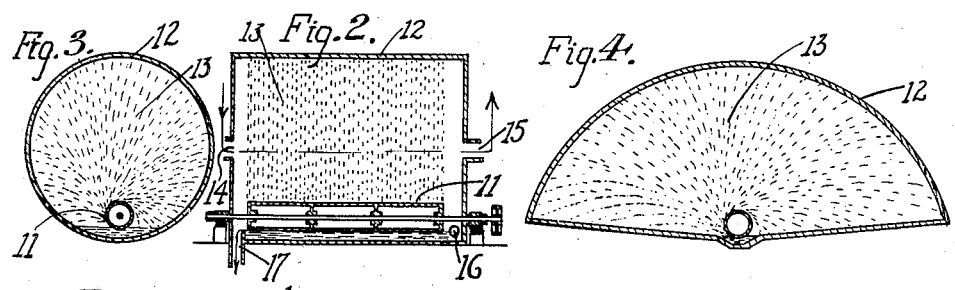
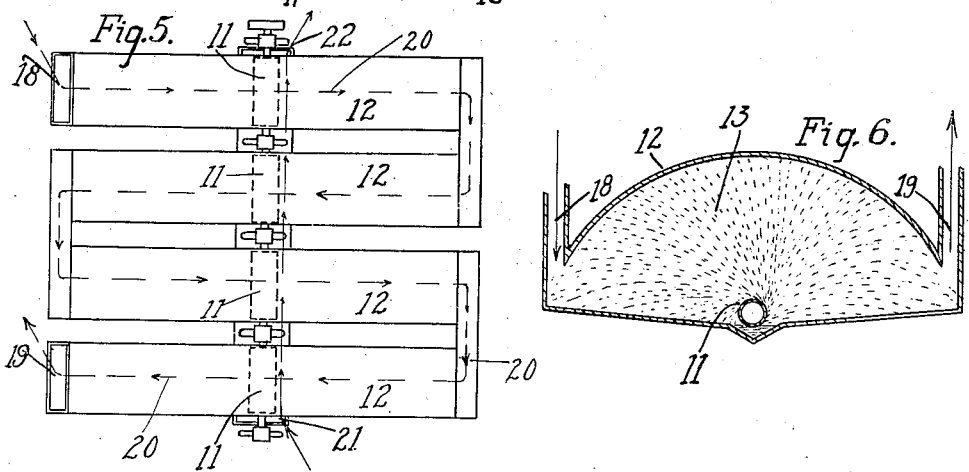
INVENTOR
Niels C. Christensen
BY
ATTORNEYS.

Patented Jan. 2, 1923.

1,441,064

UNITED STATES PATENT OFFICE.

NIELS C. CHRISTENSEN, OF SALT LAKE CITY, UTAH.

PROCESS OF TREATING LEAD ORES WITH CHLORIDE SOLUTIONS.

Application filed December 3, 1920. Serial No. 428,128.

*To all whom it may concern:*

Be it known that I, NIELS C. CHRISTENSEN, a citizen of the United States, residing at Salt Lake City, in the county of Salt Lake and State of Utah, have invented certain new and useful Improvements in Processes of Treating Lead Ores with Chloride Solutions, of which the following is a specification.

My invention relates to the treatment of lead ores for the recovery of the lead by treatment with chloride solutions. It pertains particularly to the treatment of ores containing galena for the recovery of the lead and the regeneration of the solvents used to dissolve the lead in the chloride solutions but is also applicable to the treatment of the oxidized ores of lead.

In the accompanying drawings, which are merely illustrative of the manner of carrying out the invention,—

Fig. 1 is a general diagrammatic view showing how the method is performed;

Fig. 2 a longitudinal vertical sectional view of the spray apparatus employed;

Fig. 3 a transverse vertical sectional view thereof;

Fig. 4 a similar view illustrating a modified form of housing;

Fig. 5 a top plan view of a further modified form of apparatus; and

Fig. 6 a transverse vertical section of a portion of the structure shown in Fig. 5.

As described in my patent applications Ser. Nos. 329333, 327400, 327401, and 329397, galena may be dissolved in a hot concentrated chloride solution (in most cases NaCl) containing acid or ferric chloride and may be precipitated therefrom as lead chloride by cooling the concentrated lead chloride solution. The oxidized ores of lead may also be treated in a similar way for the recovery of lead therefrom. The practical carrying out of these processes is however, very difficult by the ordinary methods now in use and one of the objects of my process is to overcome the difficulties of heating and cooling of the corrosive concentrated chloride solutions in a simple cheap and efficient manner, and in such a manner as to avoid the accumulation of wash solutions and consequent loss of chemicals and metals. Another object of my process is to recover or regenerate the acids or ferric chloride used to dissolve the lead by a simple and inexpensive treatment. In general my process would be carried out as follows:

The ore to be treated is lixiviated with a hot salt solution (or other chloride solution such as $CaCl_2$) containing acid or ferric chloride and the hot pregnant solution is separated from the residue of ore. The remaining salt and lead chloride is washed out of the residue of ore with water and this wash solution is added to the hot pregnant solution. This solution is then cooled and lead chloride precipitated therefrom.

The methods used in my process for the heating and cooling and evaporation of the solutions and the absorption of the acid gases are particularly adaptable to handling such solutions and make possible the commercial use of the process which could not be carried out by the methods ordinarily used. The general features of the methods and apparatus used are described in my patent Ser. No. 300,185 of which this particular use is one of a multitude of applications.

The methods and apparatus used for the absorption of the acid gases and for the heating and cooling of the solution are similar in a general way. They all consist in forming a spray from the solution and mixing said spray with the roaster gases for the absorption of the acid, with hot gases for heating the solution and with cold air for cooling the solution, the operation being conducted in such a manner as to secure a counter current flow of solution and gases, thus securing the highest possible efficiency of absorption and heating and cooling. These are all accomplished by the special apparatus described in my patent application Ser. No. 300,185. My method of forming the spray is to maintain the surface of the solution in contact with the lower part of a cylindrical surface revolving rapidly around a central horizontal axis, the surface of the liquid being maintained at such a level that the cylinder (or pulley or drum) is kept approximately tangent to the surface and dips slightly into the liquid. By this means the revolving surface continuously picks up a film of solution and throws the solution into the space surrounding the cylinder as a solid fan of spray. My method of bringing this spray into contact with the gases consists in enclosing a series of such cylinders in a tunnel through which the gases are passed in one direction and through which the solution flows in the opposite direction. The axes of the cylinders are preferably in line and parallel to the flow of gas and solution. The solution occupies the lower part of the tunnel and is maintained at such a level that the surface of the solution touches the lower part of the cylinders which are revolved at a relatively high speed around their supporting shaft. In this way the tunnel is kept filled with spray and the solution and spray pass through the tunnel in opposite directions giving a very intimate mixture of solution and gases and very efficient counter current flow of spray and gas. If the solution is to absorb acid gases they are passed through the tunnel, if the solution is to be cooled cold air is passed through the tunnel, and if the solution is to be heated, hot gases are passed through the tunnel. In all these operations of absorption and heating and cooling the solutions are concentrated by the evaporation of water therefrom, which may be made up with the solutions used in washing the ore. This is of considerable advantage since this makes possible the avoidance of the accumulation of solutions which must be run to waste.

From the foregoing the manner of conducting this part of my process as described in the following will be readily understood. The cold barren salt solution is first passed through the absorption apparatus as described, in counter current to the hot acid gases from the roasting operation (described later) and the acid element absorbed therein and the solution heated. If the solution is not heated sufficiently by this operation, it is then passed through a heating apparatus (as described) in counter current to hot gas sufficient to bring the solution to the required temperature. This hot regenerated solution is then used to dissolve the lead out of the ore and the hot pregnant solution separated from the residue of ore. The residue of ore is then washed with water and the wash solution added to the pregnant solution which dilutes the concentrated salt solution and makes possible the precipitation of a larger proportion of the dissolved lead chloride. This hot solution is then cooled by passing it through a cooling tunnel in counter current to a stream of cold air (as described) and the lead chloride precipitated therefrom. The cold barren solution is then separated from the precipitated lead chloride and used over again as described.

The precipitated lead chloride separated from the cold barren solution is mixed with lime (or with $CaCO_3$ if desired) and a reducing agent such as charcoal, coal, or coke and heated so as to give metallic lead and calcium chloride as indicated below:

$$PbCl_2 + CaO + C = Pb + CaCl_2 + CO$$

One of the objects of my invention is to recover the acid element from the calcium chloride thus formed for further continued use in the process. This is accomplished as described below. The lime may also be recovered at the same time.

The calcium chloride thus formed is crushed and mixed with crushed quartz or other non-fusible material and finely divided fuel such as coal, charcoal, or coke and blast roasted, i. e. roasted by igniting either the top or bottom of the charge and forcing air through the charge from the ignited side to the opposite side and oxidizing the fuel in the charge and heating it to the desired temperature.

By this means the $CaCl_2$ is decomposed and the chlorine driven off in the roaster gases and is absorbed in the barren chloride solution which is then used for the treatment of more ore. If an acid chloride solution is used the chlorine is driven off as HCl by using steam in the roast as indicated below:

$$CaCl_2 + H_2O = CaO + 2HCl$$

If a ferric chloride solution is to be used the roasting is carried out without any water being present and the chlorine driven off as indicated below:

$$CaCl_2 + O = CaO + Cl_2$$

and this chlorine is absorbed in the salt solution containing the ferrous chloride and used to convert the ferrous chloride to ferric chloride and this solution is then used for the treatment of more ore.

The decomposition of the $CaCl_2$ may be secured most readily by mixing the $CaCl_2$ with quartz sand which results in the formation of a calcium silicate as indicated below:

$$CaCl_2 + SiO_2 + H_2O = CaSiO_3 + 2HCl$$
$$CaCl_2 + SiO_2 + O = CaSiO_3 + Cl_2$$

The foregoing equations are merely illustrative as the exact composition of the silicates formed would vary with the mixture and temperatures.

The $CaCl_2$ may be mixed with finely crushed limestone or solid particles of lime and roasted as described, thus regenerating the lime as well as recovering the acid element from the $CaCl_2$. In this case more fuel is required than when quartz is used and the decomposition of the $CaCl_2$ is not entirely perfect as it is when mixed with the quartz.

The reactions occurring in this case are illustrated in the following:

$$CaCl_2 + CaO = CaOCaCl_2$$
$$CaOCaCl_2 + H_2O = 2CaO + 2HCl$$

The high temperature used in this case results in the fritting or partial fusing of the outside of the grains of CaO which should therefore be ground before being used in the smelting of more $PbCl_2$ as previously described.

From the foregoing it will be seen that my process makes possible the treatment of lead ores with hot chloride solution by simple and efficient methods and in such a manner as to avoid loss of chemicals and the building up of waste solutions. The effectiveness and value of the process will be apparent to those familiar with this department of metallurgy.

A general diagrammatic drawing illustrating a method and apparatus for carrying out my process is given in Fig. 1. The full line O indicates the comminuted ores; the dot and dash line P, the pulp (mixture of solution and ore); the broken line S, the solution; the broken line W, the wash water; the broken line W.S., the wash solution; the dotted line C, acid gases from the blast roaster; the full line $PbCl_2$, the lead chloride; the full line Pb, the lead bullion; the full line D calcium chloride. The apparatus shown consists of a series of small mechanical agitators 1 preferably made of porcelain or acid proof earthenware, a filter 2 made of similar acid proof material and using tubes of porous alundum as the filtering medium. Tubes of filtros or porous porcelain etc. may be used, but I have found the alundum tubes a very excellent filtering medium for this work. I also employ a reducing tank 3, made of porcelain or earthenware, a precipitating tank 4, preferably made of acid proof tile of the "zinc box" type used in cyanide and copper precipitation work, a cooler 5 consisting of a special form of air cooler described later. This cooler may be made of wood construction, if desired, as the solutions come from the precipitator in a reduced condition and not as corrosive as in the earlier stages of the process. 6 is a settling tank, which may also be of wooden construction, 7 a furnace suitable for the smelting of the mixture of lime or limestone, and $PbCl_2$, 8 a blast roaster, of either the up draft or down draft type, i. e., such as the $H_2H$ pots or continuous Dwight-Lloyd sintering machine, 9 a special absorption apparatus for the absorption of acid gases from the roaster 8 in the mill solution, of acid proof tile or wooden construction, described later, and 10 a special heating device for heating the mill solution by direct contact with hot gases.

The special pieces of apparatus 5, 9 and 10, for heating and cooling the solutions and for absorbing the chlorine are constructed on the same general principle. The general method of construction is indicated in Figs. 2, 3, 4 and 5. The method of handling the solutions in each of these is as follows:

The solution is made into a spray by bringing the surface of a rapidly revolving cylinder 11 into contact with the surface of the solution so that the cylinder dips slightly into the liquid (from $\frac{1}{16}$ to $\frac{1}{2}''$, according to the density of the spray desired.) This operation is conducted in an enclosed passage surrounded by a suitable housing 12, in the lower part of which the solution is contained, and the upper part 13, of which, is filled with the spray thrown by the cylinder 1. The gases to be brought into contact with the spray of solution are passed through the spray enclosed in the housing 12. For example, for heating the solution, hot gases from a furnace or stove are passed through the spray, for cooling the solution, cold air is passed through the spray, cooling it by evaporation; for the absorption of chlorine or acid gases, these gases are passed through the spray. For acid absorption, and to secure the highest efficiency in heating and cooling, a counter current flow of gases and solution is preferable. This counter current flow is secured by passing the gases and solution through the tunnel or housing 12 in opposite directions, as shown in Figs. 2, 3 and 4.

Fig. 2 shows a longitudinal vertical section of the apparatus and Figs. 3 and 4 vertical cross sections showing different shapes of housing. The circular housing 12 shown in Fig. 3 does not obtain the benefit of the full fan of spray thrown by the cylinder, whereas the fan shaped housing 12 of Fig. 4 secures the benefit of a larger part of the fan of spray. This type of housing is also especially suitable for construction of acid proof brick. The choice of the style of housing will depend on the volume of gas to be handled and the material of construction; a number of sections of housing may be connected in series to secure as long a period of contact between gases and solution as is desired. In this case the flow of gases and the flow of solution are parallel to the axis of the cylinder spray 1, but in opposite directions, the gases entering at 14 and leaving at 15, and the solutions entering at 16 and leaving at 17.

For cases in which it is not desired to secure such an efficient counter current as just described, the arrangement shown in Figs. 5 and 6 may be used. Fig. 5 shows a vertical section of one of the housings of this apparatus, which is similar to that shown in Fig. 4, except that the gases in this case pass through the housing 12 and spray transversely to the axis, entering at one side 18, and leaving at the other, 19. In order to secure a counter current effect in this type of apparatus, a number of such sections of housing are placed side by side so that the cylinders are end to end, and the gases flow successively through the housings, as shown by the arrows 20 in Fig. 5, entering at 18 and leaving at 19. The solution enters at 21 and flows through each housing parallel to the axis of the cylinders 1 leaving at 22. This arrangement of my apparatus has some advantages in construction for work with acid solutions.

The process is carried out in a general way as follows: The hot salt solution 3 containing the required amount of acid or ferric chloride and the comminuted ore O are continuously fed into the first of the series of agitators 1 in suitable relative proportions, and passed through the agitators to the filter 2 where the hot pregnant solution is removed and the residue of ore washed with the wash water W. From the filter 2 the pregnant solution passes through the reducing box 3 which contains galena (or lead, if desired) sufficient time being allowed in this box to reduce the excess of ferric chloride remaining in the solution. If a slightly acid or substantially neutral brine is used, this box 3 will not be employed. From the reducer 3 the hot pregnant solution flows to the precipitation box 4 in which the gold and silver are first precipitated with copper (or lead if desired) and the copper with lead. From this precipitator the hot solution flows to the cooler 5 being first mixed with the wash solution from the filter to cool and dilute the solution so as to secure as complete a precipitation as possible. In passing through the cooler the solution is cooled by a current of cold air blown through the spray of solution as previously described. This results in a considerable evaporation of water from the solution. The cold solution carrying the precipitated $PbCl_2$ flows to the settling tank 6 and the lead chloride is settled out. The lead chloride is mixed with brine or limestone and reducing agent and is smelted in the furnace 7. This furnace may be a blast or reverberatory furnace, or an externally heated retort or crucible. For small installations the latter would probably be used. For larger installations the reverberatory or blast furnace would be used. In case the latter is used the mixture of $PbCl_2$ and lime material will have to be briquetted before smelting. The PbCl is very readily reduced, giving a very pure lead and molten $CaCl_2$.

The crushed or granulated anhydrous calcium chloride is mixed with quartz or lime material and from 7½ to 10% fuel in the form of coal dust or other suitable fuel, and this mixture is then roasted in the blast roaster 8, decomposing the $CaCl_2$ and driving off the chlorine as Cl or HCl. This chlorine or HCl is absorbed in the cold barren mill solution in the absorber 9 by being brought into contact with the solution spray, as previously described, to regenerate the solution for the treatment of more ore. From the absorber 9 the solution is passed through the heater 11, and is heated by bringing the solution spray into contact with hot gases from a furnace or grate, as previously described. The position of the absorber 9 and heater 10 may be reversed, if desired, absorbing the hot acid gases from the roaster 8 in the hot solution. The heating of the solution with the hot gases in the heater 10 results in a considerable evaporation of water from the solution. As previously stated this loss is made up by the wash water used in washing the lixiviated ore.

The tailings T discharged from the filter 2 may be treated by the flotation process to recover any pyrite or chalcopyrite which may contain gold and silver.

Though the apparatus described are my preferred forms, others may be used, if desired.

It is apparent that the brief description possible in the scope of a patent application cannot cover all the details or variations possible in the application of my process and I do not therefore, desire to be limited entirely by the foregoing but by the appended claims.

Having described my process, what I claim and desire to patent is:

1. In the process of treating lead ores with hot chloride solution for the recovery of the lead, the heating of said solutions for treating the ore by passing said chloride solution through a horizontal tunnel and passing hot gases through said tunnel and maintaining the surface of the body of said solution in contact with the lower parts of a number of cylinders enclosed in said tunnel and revolving rapidly about a horizontal axis whereby said solution is thrown into said gases in the form of a spray and is heated and water evaporated therefrom.

2. In the process of treating lead ores with hot chloride solutions for the recovery of the lead the heating of said solutions for treating the ore by passing said solutions through a horizontal tunnel in one direction and passing hot gases through said tunnel in the opposite direction and maintaining the surface of the body of said solution in contact with the lower parts of a number of cylinders enclosed in said tunnel and revolving rapidly about a horizontal axis approximately parallel to said direction of flow, whereby said solution is thrown into said gases in the form of a spray and is heated and water evaporated therefrom.

3. In the process of treating lead ores with chloride solutions for the recovery of the lead as lead chloride, the cooling of the pregnant solution to precipitate lead chloride therefrom by passing said solution through a horizontal tunnel and passing cold gases through said tunnel and maintaining the surface of the body of said solution in contact with the lower parts of a number of cylinders enclosed in said tunnel and revolving rapidly about a horizontal axis whereby said solution is thrown into said gases in the form of a spray, and whereby the solution is cooled and water evaporated therefrom.

4. In the process of treating lead ores with chloride solutions for the recovery of the lead as lead chloride, the cooling of the pregnant solution to precipitate lead chloride therefrom by passing said solution through a horizontal tunnel in one direction and passing cold gases through said tunnel in the opposite direction and maintaining the surface of the body of said solution in contact with the lower parts of a number of cylinders enclosed in said tunnel and revolving rapidly about a horizontal axis approximately parallel to said direction of flow, whereby said solution is thrown into said gases in the form of a spray and is cooled and water evaporated therefrom.

5. In the process of treating lead ores with acid chloride solutions for the recovery of the lead, the absorption of acid gases from roaster gases in a chloride solution by passing said chloride solutions through a horizontal tunnel and passing said roaster gases through said tunnel and maintaining the surface of the body of said solution in contact with the lower parts of a number of cylinders enclosed in said tunnel and revolving rapidly about a horizontal axis whereby said solution is thrown into said gases in the form of a spray whereby said acid gases are absorbed in said solution.

6. In the process of treating lead ores with acid chloride solutions for the recovery of the lead, the absorption of acid gases from roaster gases in a chloride solution by passing said chloride solutions through a horizontal tunnel in one direction and passing said roaster gases through said tunnel in the opposite direction and maintaining the surface of the body of said solution in contact with the lower parts of a number of cylinders enclosed in said tunnel and revolving rapidly about a horizontal axis approximately parallel to said direction of flow whereby said solution is thrown into said gases in the form of a spray, and whereby said acid gases are absorbed in said solution.

7. In the process of treating lead ores with chloride solutions for the recovery of the lead as a chloride by cooling the pregnant solution, the addition of the wash solutions to the pregnant solution, before cooling said solution, in order to secure a more complete precipitation of lead chloride therefrom.

8. In the process of treating lead ores with chloride solutions in which the lead is precipitated as lead chloride, the smelting of the precipitated lead chloride with lime material and a reducing agent to secure lead and calcium chloride, and decomposing said calcium chloride to recover the acid element therefrom by mixing said calcium chloride with finely divided fuel and other solid particles and subjecting said mixture to a blast roasting operation whereby said calcium chloride is decomposed and the acid element driven off in the roaster gases, and absorbing said acid element in the barren solution and using said solution for the treatment of more ore.

9. In the process of treating lead ores with chloride solutions in which the lead is precipitated as lead chloride, the smelting of the precipitated lead chloride with lime material and a reducing agent to secure lead and calcium chloride, and decomposing said calcium chloride in order to recover the acid element therefrom by mixing said calcium chloride with finely divided quartz and finely divided fuel and subjecting the mixture to a blast roasting operation whereby said calcium chloride is decomposed and the acid element driven off in the roaster gases and absorbing said acid element in the barren solution and using said solution for the treatment of more ore.

10. In the process of treating lead ores with chloride solutions in which the lead is precipitated as lead chloride, the smelting of the precipitated lead chloride with line material and a reducing agent to secure lead and calcium chloride, and decomposing said calcium chloride in order to recover the lime and acid element therefrom by mixing said calcium chloride with finely divided lime material and finely divided fuel and subjecting the mixture to a blast roasting operation whereby said calcium chloride is decomposed and the acid element driven off, and calcium oxide formed, and absorbing said acid element in the barren solution and using said solution for the treatment of more ore, and using said calcium oxide to smelt more lead chloride.

11. The process of treating lead ores with chloride solutions for the recovery of the lead therefrom as a chloride which consists in heating the chloride solution by passing said solution through a horizontal tunnel and passing hot gases through said tunnel and maintaining the surface of the body of said solution in contact with the lower parts of a number of cylinders enclosed in said tunnel and revolving rapidly about a horizontal axis whereby said solution is thrown into said gases in the form of a spray, and is heated; lixiviating the ore with said hot chloride solution; separating the pregnant solution from the residue of ore, and cooling said hot pregnant solution by passing cold air through said solution in the form of a spray in the manner described above and thereby precipitating lead chloride from said solution.

12. The process of treating lead ores with chloride solutions for the recovery of the lead therefrom as a chloride, which consists in heating the chloride solution by passing said solution through a horizontal tunnel and passing hot gases through said tunnel and maintaining the surface of the body of said solution in contact with the lower parts of a number of cylinders enclosed in said tunnel and revolving rapidly about a horizontal axis whereby said solution is thrown into said gases in the form of a spray, and lixiviating the ore with said hot chloride solution separating the pregnant solution from the residue of ore; washing the residue of ore with water and adding the wash solution to said pregnant solution; and cooling said pregnant solution by passing cold air through said solution in the form of a spray, in the manner described above, and thereby precipitating lead chloride from said solution.

13. The process of treating lead ores with chloride solutions for the recovery of the lead therefrom, which consists in heating the barren chloride solution by passing said solution through a horizontal tunnel and passing hot gases through said tunnel and maintaining the surface of the body of said solution in contact with the lower parts of a number of cylinders enclosed in said tunnel and revolving rapidly about a horizontal axis whereby said solution is thrown into said gases in the form of a spray and is heated; absorbing the acid fumes from the furnace gases from the blast roasting treatment of calcium chloride in said solution by bringing said gases into contact with said solution in the form of a spray in the manner described above; lixiviating the ore with said hot chloride solution containing said added acid element; separating the pregnant solution from the residue of ore; washing the residue of ore with water and adding the wash solution to said pregnant solution; cooling said pregnant solution, by passing a current of cold air through said solution in the form of a spray in the manner described above, and thereby precipitating lead chloride from said solution.

14. The process of treating lead ores with chloride solutions for the recovery of the lead therefrom which consists in heating the barren chloride solution by passing said solution through a horizontal tunnel and passing hot gases through said tunnel and maintaining the surface of the body of said solution in contact with the lower parts of a number of cylinders enclosed in said tunnel and revolving rapidly about a horizontal axis whereby said solution is thrown into said gases in the form of a spray and is heated; and absorbing the acid fumes from the furnace gases from the blast roasting treatment of calcium chloride in said barren solution by bringing said gases into contact with said solution in the form of a spray in the manner described above; lixiviating the ore with said hot chloride solution containing said added acid element; separating the pregnant solution from the residue of ore; washing the residue of ore with water and adding the wash solution to said pregnant solution; cooling said pregnant solution by passing a current of cold air through said solution in the form of a spray in the manner described above, and thereby precipitating lead chloride from said solution; smelting said precipitated lead chloride with lime material and a reducing agent to get metallic lead and calcium chloride; mixing said calcium chloride with finely divided fuel and other solid particles and subjecting said calcium chloride to a blast roasting operation whereby said calcium chloride is decomposed and the acid element driven off in the roaster gases; absorbing said acid element in barren chloride solution and using it in the treatment of more ore.

15. The process of treating lead ores with chloride solutions for the recovery of the lead therefrom, which consists in heating the barren chloride solution by passing said solution through a horizontal tunnel and passing hot gases through said tunnel and maintaining the surface of the body of said solution in contact with the lower parts of a number of cylinders enclosed in said tunnel and revolving rapidly about a horizontal axis whereby said solution is thrown into said gases in the form of a spray and is heated; absorbing the acid fumes from the furnace gases from the blast roasting treatment of calcium chloride in said barren solution by bringing said gases into contact with said solution in the form of a spray in the manner described above; lixiviating the ore with said hot chloride solution containing said added acid element; separating the pregnant solution from the residue of ore; washing the residue of ore with water and adding the wash solution to said pregnant solution; and cooling said pregnant solution by passing a current of air through said solution in the form of a spray in the manner described above, and thereby precipitating lead chloride from said solution; smelting said precipitated lead chloride with lime material and a reducing agent to get metallic lead and calcium chloride; mixing said chloride with finely divided fuel and finely broken quartz and subjecting said mixture to a blast roasting operation whereby said calcium chloride is decomposed and the acid element driven off in the roaster gases; absorbing the said acid element in barren chloride solution and using it in the treatment of more ore.

16. The process of treating lead ores with chloride solutions for the recovery of the lead therefrom which consists in heating the barren chloride solution by passing said solution through a horizontal tunnel and passing hot gases through said tunnel and maintaining the surface of the body of said solution in contact with the lower parts of a number of cylinders enclosed in said tunnel and revolving rapidly about a horizontal axis whereby said solution is thrown into said gases in the form of a spray and is heated; absorbing the acid fumes from the furnace gases from the blast roasting treatment of calcium chloride in said barren solution by bringing said gases into contact with said solution in the form of a spray in the manner described above; lixiviating the ore with said hot chloride solution containing said added acid element; separating the pregnant solution from the residue of ore; washing the residue of ore with water and adding the wash solution to said pregnant solution; cooling said pregnant solution by passing a current of cold air through said solution in the form of a spray in the manner described above and thereby precipitating lead chloride from said solution; smelting said precipitated lead chloride with lime material and a reducing agent to get metallic lead and calcium choride; mixing said calcium chloride with finely divided fuel and finely broken lime material and subjecting said mixture to a blast roasting operation whereby said calcium chloride is decomposed and the acid element driven off in the roaster gases; absorbing said acid element in barren chloride solution and using it in the treatment of more ore; and using the lime thus formed for the smelting of more lead chloride.

In testimony whereof I have signed my name to this specification.

NIELS C. CHRISTENSEN.